2 Sheets—Sheet 1.

D. CUSHING.

Harvester Rake.

No. 5,934.

Patented Nov. 21, 1848

2 Sheets—Sheet 2.

D. CUSHING.
Harvester-Rake.

No. 5,934.

Patented Nov. 21, 1848.

UNITED STATES PATENT OFFICE.

DANIEL CUSHING, OF AURORA, ILLINOIS.

IMPROVEMENT IN HARVESTING-MACHINES.

Specification forming part of Letters Patent No. 5,934, dated November 21, 1848.

*To all whom it may concern:*

Be it known that I, DANIEL CUSHING, of Aurora, Kane county, Illinois, have invented new and useful Improvements in the Harvesting-Machine called "The Prairie Reaper," which is described as follows, reference being had to the annexed drawings of the same, making part of this specification.

Figure 1:
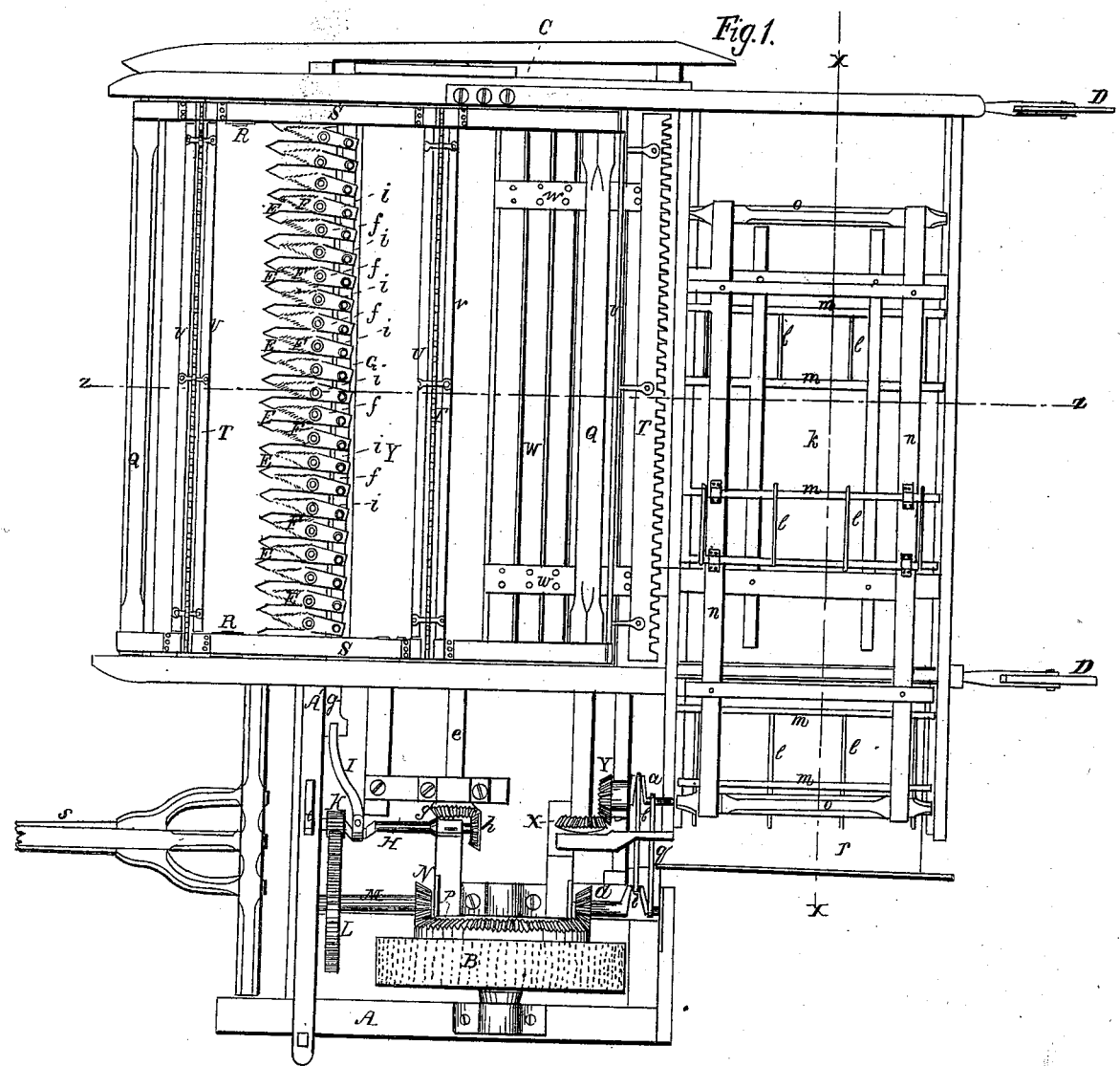
Figure 2:
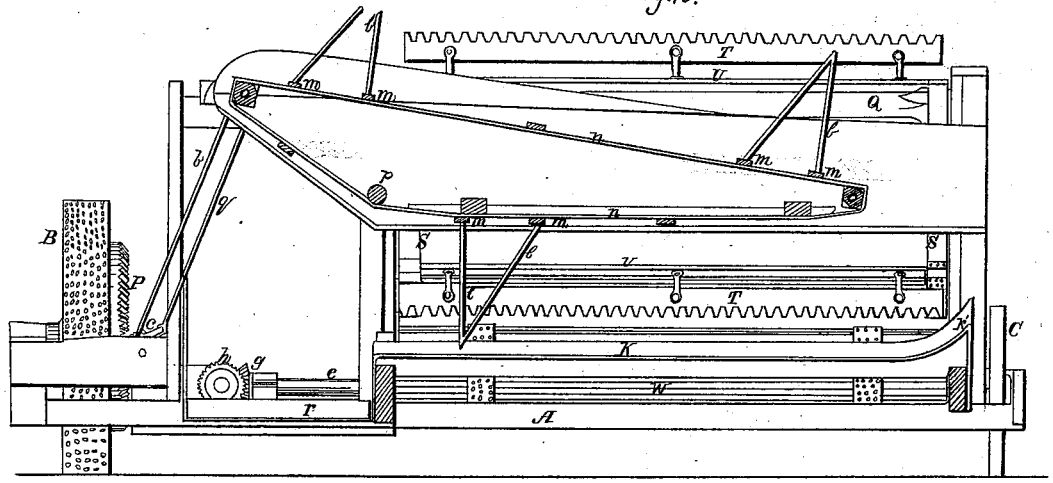
Figure 3:
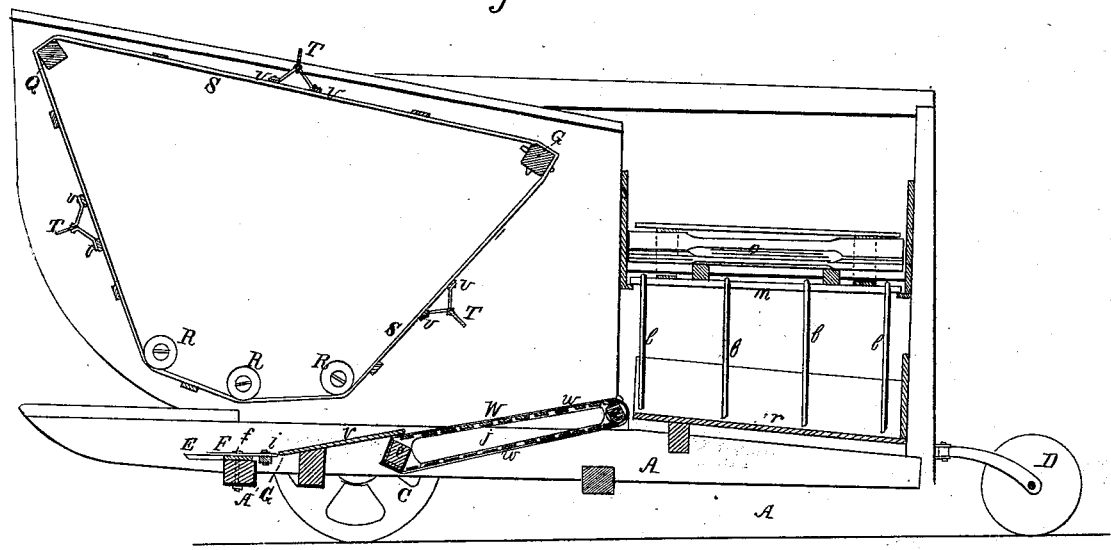

Figure 1 is a top view of the machine. Fig. 2 is vertical transverse section on the line *x x* of Fig. 1. Fig. 3 is a vertical longitudinal section on the line *z z* of Fig. 1.

Similar letters in the several figures refer to corresponding parts.

A is the frame, made in the usual manner of such frames.

B is the main driving-wheel for propelling the cutters, the revolving rakes, and endless conveyer, and for sustaining one side of the machine, turning upon the ground in the usual manner, and having its periphery jagged to prevent slipping.

C is a wheel for sustaining the opposite side of the frame.

D D are two small rollers, operating on the principle of furniture-casters, for sustaining the rear part of the frame at a suitable distance above the ground. The machine, being nearly balanced on the axles of the two forward wheels, will not bear heavily upon the two rollers D D.

E are stationary pointed teeth for receiving the grain to be cut between them, fastened to the forward transverse timber of the frame, made flat and even on the upper surface to receive vibrating pointed sickle-edged teeth, which act upon them in the manner of scissors or shears, said stationary teeth being beveled on the under side around the edges.

F are vibrating spear-shaped sickle-edge teeth, blades, or cutters, vibrating upon the stationary teeth E for cutting the grain, having their forward edges next the points made beveling, and serrated, like a sickle, for holding the grain while being cut against the edges of the lower teeth or blades, and preventing it from slipping against the cutting-edges.

*f* are the pins that connect the vibrating cutters or blades to the bar A', containing the stationary teeth or blades, and serving as their fulcra.

*i* are bolts that connect the rear or blunt ends of the serrated blades to a transverse vibrating bar, G, connected to and moved to and fro by a revolving crank-shaft, H, by a connecting-rod, I, said crank-shaft H being turned by a pinion, K, geared to a cog-wheel, L, on a shaft, M, on which there is a bevel-pinion, N, meshing into gear with a bevel-wheel, P, fixed to the side of the main driving-wheel B.

Q Q are parallel revolving axles, and R R R are short rollers turning on studs, around which are passed two endless straps, S S, to which are affixed transverse rakes T, arranged between parallel bars U, for dividing the grain standing, and bending it toward the cutters F, and, being cut, to move it back upon the platform V and endless conveyer W. The portions of the parallel axles Q around which the endless straps S pass are made of a polygonal form to prevent slipping. One of the axles is extended beyond the side of the frame far enough to receive a bevel-pinion, X, which is made to engage with a bevel-pinion, Y, on a double-crank axle, *a*, from which a rod, *b*, is extended to another double-crank axle, *c*, on which there is a bevel-pinion, *d*, that is geared with the bevel-wheel P on the face of the driving-wheel B, by which the revolving endless rake is turned as the machine is moved forward, and by which the grain is moved back upon the endless conveyer W. The endless conveyer W is composed of endless straps *w*, to which are affixed parallel slats of about the width of the sides of the shafts *e*, around which the endless chain of slats is passed, and by which it is propelled, one of said shafts *e* being extended beyond the side of the frame next the driving-wheel to receive a bevel-pinion, *g*, geared to a bevel-pinion, *h*, on the crank-axle H, by which the endless conveyer W is revolved simultaneously with the movements of the machine. *j* is one of the ribs for preventing the sagging of the endless conveyer.

*k* is an inclined transverse platform for receiving the grain from the endless conveyer W. This platform is turned up at one end in the form of a segment of a circle, and then vertically downward and fastened to the frame, as represented at *k'* in Fig. 2, and at the other or discharging end, which is next the tilting board, it is also bent downward at right angles and fastened to the frame. This platform inclines slightly from the curved end toward the tilting board and from the endless conveyer to the rear side.

$l$ are the teeth of a revolving rake, shaped like the letter V, inserted into parallel slats $m$, fixed to endless straps $n$, passed around revolving polygonal or square shafts $o$ and guide-roller $p$, one of said shafts being connected with the double crank $a$, by which it is turned by means of a connecting-rod, $q$, leading from the crank $a$ to the crank $c$.

The tilting board $r$, for receiving the grain and discharging it in gavels upon the ground, is secured by one of its ends to the frame, while its other end drags upon the ground, having its side next the propelling-wheel turned up at right angles to prevent the grain from falling off. This board should hang loosely at an angle of about twenty or thirty degrees with a horizontal plane.

$s$ is the tongue, to which the horses are attached for drawing the machine.

$t$ is a lever, into which the end of the crank-shaft H is inserted. The fulcrum of this lever is a pin inserted into the lower part of the frame. By moving the upper end of this lever toward the cutters in the arc of a circle the pinion K will be thrown out of gear with the cog-wheel L, which will stop the motion of the cutters.

Operation: The machine being drawn forward, the revolving of the main driving-wheel puts in motion all the gearing, crank-shafts, rods, cutters, rakes, and conveyers. The revolving rake T strikes the grain and bears it over toward the vibrating sickle-edged cutters and forces it between their edges and the edges of the stationary pointed blades, where it is cut by the vibration of the sickle-edged cutters and falls upon the platform V, between the cutters and endless conveyer W, from whence it is carried back by the said revolving rakes T to the endless conveyer W, which conveys it to the inclined platform $k$, where it is met by the teeth $l$ of the revolving transverse rake $l$ $m$ $n$ and carried to the inclined discharging-board $r$ in such quantities as will be sufficient to form gavels of any required size. From this board it is discharged upon the ground in separate gavels in readiness for being bound. The size of the gavels will be increased by placing the teeth of the transverse endless rake farther apart on the endless bands, and will be diminished by placing them nearer together. The operation of the lever $t$ having been described, it need not be repeated.

I do not claim to be the first inventor of a reaping-machine drawn by horses, having vibrating cutters actuated by gearing connected with a main supporting and driving wheel, and having a revolving rake and platform upon which the grain is deposited, as this is an old invention; but What I do claim as my invention and improvement, and desire to secure by Letters Patent, is—

1. Making the vibrating cutters F sickle-edged, moved in the manner and for the purpose set forth.

2. The manner of combining and arranging the double cranks $a$ $c$ and axles O Q of the rakes, so as to cause them to turn together, and at the same time to turn the two endless rakes $l$ $m$ $n$ and S T U, as described.

3. The before-described particular arrangement of the transverse endless revolving rakes $l$ $m$ $n$, in combination with rake T T T, for delivering the cut grain upon the platform $r$, as described.

In testimony whereof I have hereunto signed my name, before two subscribing witnesses, this 30th day of September, 1848.

DANIEL CUSHING.

Witnesses:
WM. A. PARKER,
H. C. KELLY.